United States Patent
Bonaventura et al.

(10) Patent No.: US 7,283,295 B2
(45) Date of Patent: Oct. 16, 2007

(54) RELEASABLE/INTERCHANGEABLE FINE FOCUS KNOB FOR A MICROSCOPE

(75) Inventors: Russell Bonaventura, Williamsville, NY (US); Paul M. Harrison, Alden, NY (US); Kenneth M. Northem, West Seneca, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 137 days.

(21) Appl. No.: 10/811,346

(22) Filed: Mar. 26, 2004

(65) Prior Publication Data

US 2005/0111091 A1 May 26, 2005

Related U.S. Application Data

(63) Continuation-in-part of application No. 10/721,695, filed on Nov. 25, 2003, and a continuation-in-part of application No. 10/733,628, filed on Dec. 11, 2003.

(51) Int. Cl.
G02B 21/32 (2006.01)
(52) U.S. Cl. ............... 359/383; 359/368; 359/392
(58) Field of Classification Search ............... 359/368, 359/383, 392–394
See application file for complete search history.

(56) References Cited

U.S. PATENT DOCUMENTS

| | | | | |
|---|---|---|---|---|
| 4,158,216 A | * | 6/1979 | Bigelow | 200/600 |
| 4,233,593 A | * | 11/1980 | Bigelow | 341/15 |
| 4,616,517 A | * | 10/1986 | Esmay | 74/10.45 |
| 4,619,503 A | | 10/1986 | Reinheimer et al. | |
| 5,552,321 A | | 9/1996 | Focht | |
| 5,557,456 A | | 9/1996 | Garner et al. | |
| 5,684,627 A | * | 11/1997 | Ganser et al. | 359/388 |
| 6,018,415 A | | 1/2000 | Woo et al. | |
| 2002/0159147 A1 | | 10/2002 | Yamamoto | |
| 2003/0169492 A1 | | 9/2003 | Nishida et al. | |
| 2004/0246571 A1 | * | 12/2004 | Bonaventura | 359/368 |

FOREIGN PATENT DOCUMENTS

AT 252612 2/1967
DE 10060763 7/2002

OTHER PUBLICATIONS

Leitz Service. "Ergolux B 0 1—Ersatzteilliste", Ernst Leitz Wetzlar GmbH, Jun. 14, 1982.
Leica Service. "Leica FTM-20", p. 3 and 11, 1995.
Leica Service. "Leitz Secolux 6×6," Ernst Leitz Wetzlar GmbH, 1982.

* cited by examiner

Primary Examiner—Joshua L Pritchett
(74) Attorney, Agent, or Firm—Simpson & Simpson, PLLC

(57) ABSTRACT

A microscope includes at least one focusing means for focusing an object plane. The focusing means includes first and second adjustment means. The first and second adjustment means are coaxial and independently rotatably adjustable with respect to one another. The second adjustment means are releasably fastenable to the focusing means. In a preferred embodiment, the first adjustment means comprises a coarse focus adjustment knob and the second adjustment means comprises a fine focus adjustment knob. The second adjustment means preferably includes magnetic means adapted for mating engagement with complementary magnetically attractable means of a rotatable focus drive means of the focusing means. A particularly preferred embodiment comprises at least two focusing means wherein the second adjustment means of each may be releasably attached to each; one on each opposite side of the microscope as desired.

18 Claims, 6 Drawing Sheets

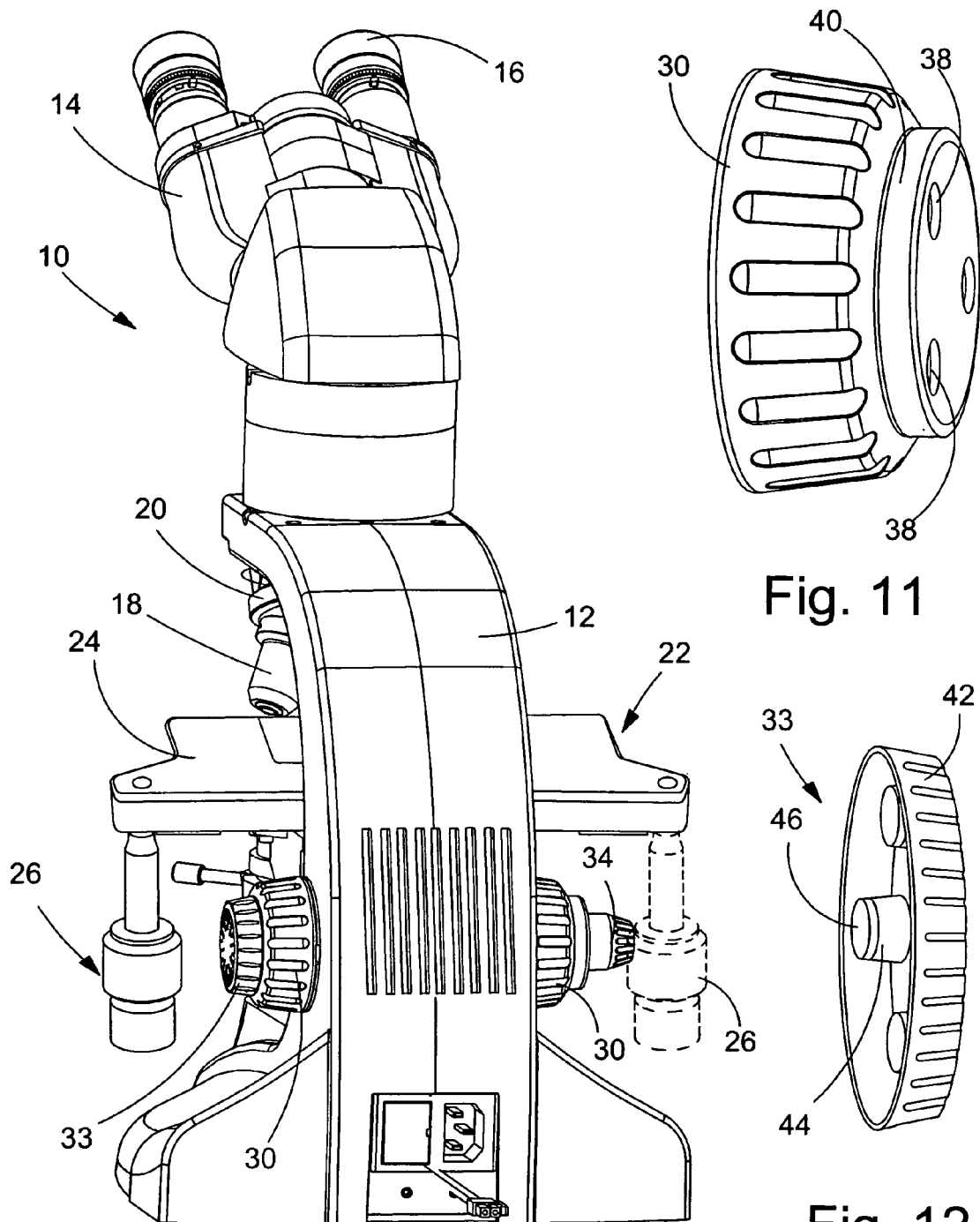
Fig. 10
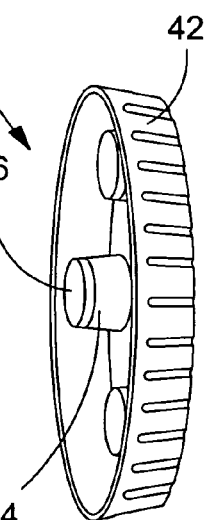
Fig. 11
Fig. 12

# RELEASABLE/INTERCHANGEABLE FINE FOCUS KNOB FOR A MICROSCOPE

CROSS REFERENCE TO RELATED APPLICATIONS

This application for patent is a Continuation-in-Part of U.S. patent application Ser. No. 10/721,695, filed Nov. 25, 2003 and Ser No. 10/733,628 filed Dec. 11, 2003.

FIELD OF THE INVENTION

The present invention relates generally to microscopy, and more specifically to a mechanism for controlling microscope stage movement, and even more particularly, to a mechanism for adjusting the vertical displacement of a microscope stage.

BACKGROUND OF THE INVENTION

As is well known, a microscope is an optical instrument used to view, examine and study very small objects. There are many different types of microscopes with different types being best suited for particular applications. Types of microscopes include, but are not limited to: compound microscopes, stereomicroscopes, confocal microscopes, inverted microscopes, and laser microscopes, etc.

Microscopes have long used stages for the positioning of samples within the optical path. An object can be manipulated by moving the stage forwards and backwards, left and right, and up and down. A common convention for naming the left-right, front-back, and up-down axes is x, y, and z, respectively.

Often, the focusing mechanism functions by adjusting the stage height. By changing the sample height, the microscopist can focus and observe different depths within the z-axis of the sample.

In order to adjust the x or the y position, the user must have available a stage control mechanism capable of performing this movement. Typically, both x and y adjustment are performed by a single mechanism. Additionally, this mechanism is located under and to one side of the stage.

Due to the variety of microscopists using these instruments, both left & right-handed stages are required. The location of the stage control mechanism is on the side of the stage matching the user's predominant hand of use. Further complicating the problem, a laboratory may have a left-handed and a right-handed user sharing a single microscope.

Having to match the stage configuration to the microscopist's predominate hand creates difficulty for the manufacture of product. Each microscope must be either a left-handed or a right-handed microscope. After the assembly is complete, changing the configuration requires significant disassembly and reassembly time, as well as requiring a complete additional stage mechanism. This problem also requires microscope manufacturers to maintain inventories of both left-handed and right-handed stage assemblies.

As a result, the assignee of the present application for patent has developed a microscope comprising a stage drive assembly that is easily removed and secured to opposite sides of a microscope stage as may be desired by the microscopist. Such microscope is described in an application filed concurrently herewith by the assignee, which application is entitled "Interchangeable Microscope Stage Drive Assembly" and incorporated herein by reference.

In view of the development of the interchangeable stage drive assembly described above, there has also arisen a need for a focus adjustment knob for a microscope that may also be easily released and fastened to opposite sides of a microscope/microscope stage.

BRIEF SUMMARY OF THE INVENTION

The present invention is directed to a microscope having at least one adjustment means for affecting a microscope parameter. In a preferred embodiment, the adjustment means comprises at least one focusing means for focusing an object plane. The focusing means comprises coarse and fine focus adjustment knobs. The coarse and fine focus adjustment knobs are coaxial and independently rotatably adjustable with respect to one another. The fine focus adjustment knob is releasably fastenable to the focusing means. In a preferred embodiment, the fine focus adjustment knob includes magnetic means adapted for engagement with complementary magnetically attractable means of a rotatable focus drive means of the focusing means. In a preferred embodiment a microscope comprises at least two adjustment means, e.g., focusing means, disposed on opposite sides of the microscope.

Thus, an object of the invention is to provide an improved means for adjusting a microscope parameter.

Another object of the invention is to provide an improved means for focusing a microscope which means may be readily modified by a user.

A further object of the invention is to provide an improved means for focusing a microscope which means may be readily modified by a user according to a user's handedness.

These and other objects, features and advantages of the present invention will become readily apparent to those having ordinary skill in the art upon reading the detailed description of the invention in view of the drawings and appended claims.

BRIEF DESCRIPTION OF THE DRAWINGS

The nature and mode of operation of the present invention will now be more fully described in the following detailed description of the invention taken with the accompanying drawing figures, in which:

FIG. 7 is a perspective view of a coarse focus adjustment knob and rotatable focus drive means according to the present invention;

FIG. 8 is a perspective view of a shortened fine focus knob according to the present invention operatively arranged to be secured on side of the microscope opposite the elongate fine focus knob;

FIG. 10 is a rear perspective view of an alternative embodiment of a microscope according to the present invention;

FIG. 11 is a perspective view of a coarse focus adjustment knob and rotatable focus drive means according to the present invention;

FIG. 12 is a perspective illustration of an alternative embodiment of a removable fine focus adjustment knob according to present invention; and, FIGS. 13 and 14 are exploded and perspective illustrations, respectively, of another alternative embodiment of a removable fine focus knob according to the present invention.

DETAILED DESCRIPTION OF THE INVENTION

It should be appreciated at the outset that while the present invention relates to a "Releasable/Interchangeable Fine Focus Knob for a Microscope", the assignees of the present application for patent have developed certain other improvements to microscopes, said improvements described in United States patent applications entitled "Interchangeable Microscope Stage Drive Assembly", "Means for Transporting a Microscope", "Ergonomically Arranged Object Adjustment Controls", "Shielded-Ergonomic Microscope Stages" and "Lamp Assembly for a Microscope", which applications are filed concurrently herewith by the assignees of the present application for patent, and which applications are incorporated herein by reference in their entireties.

Additionally, at the outset it should be appreciated that like drawing numbers on different drawing views identify identical structural elements of the invention. While the present invention is described with respect to what is presently considered to be the preferred embodiments, it is to be understood that the invention as claimed is not limited to the disclosed embodiments. In the description that follows, the terms "up", "down", "forward", "backward", "left", "right", and their derivatives and corollaries, should be interpreted from the perspective of one standing in front of the microscope shown in FIG. 1 so as to peer through the eyepieces.

The present invention broadly comprises adjustment means for adjusting a microscope parameter. In a preferred embodiment, the adjustment means comprises focusing means for a microscope wherein the focusing means comprises a coarse focus adjustment knob and a fine focus adjustment knob for vertically displacing a microscope stage. In a preferred embodiment, focusing means are disposed on opposite sides of a microscope, e.g. right and left sides, and the fine focus adjustment knobs of each focusing means may be selectively released therefrom and refastened to the focusing means of the opposite side. In a particularly preferred embodiment, the fine focus adjustment knobs are releasably secured to a focus drive means of the focusing means and one of the fine focus adjustment knobs has an axial length greater than the other. Hence, the present invention is, preferably, intended for use in association with a microscope comprising an interchangeable stage drive mechanism, as described, supra, such that the fine focus adjustment knob having a greater axial length may be readily alternated from one side of the microscope to the other depending on the side of the microscope the user locates the interchangeable stage drive mechanism. It should be appreciated, however, that the present invention may be utilized with microscopes that do not have interchangeable stage drive mechanisms.

Figure 1:
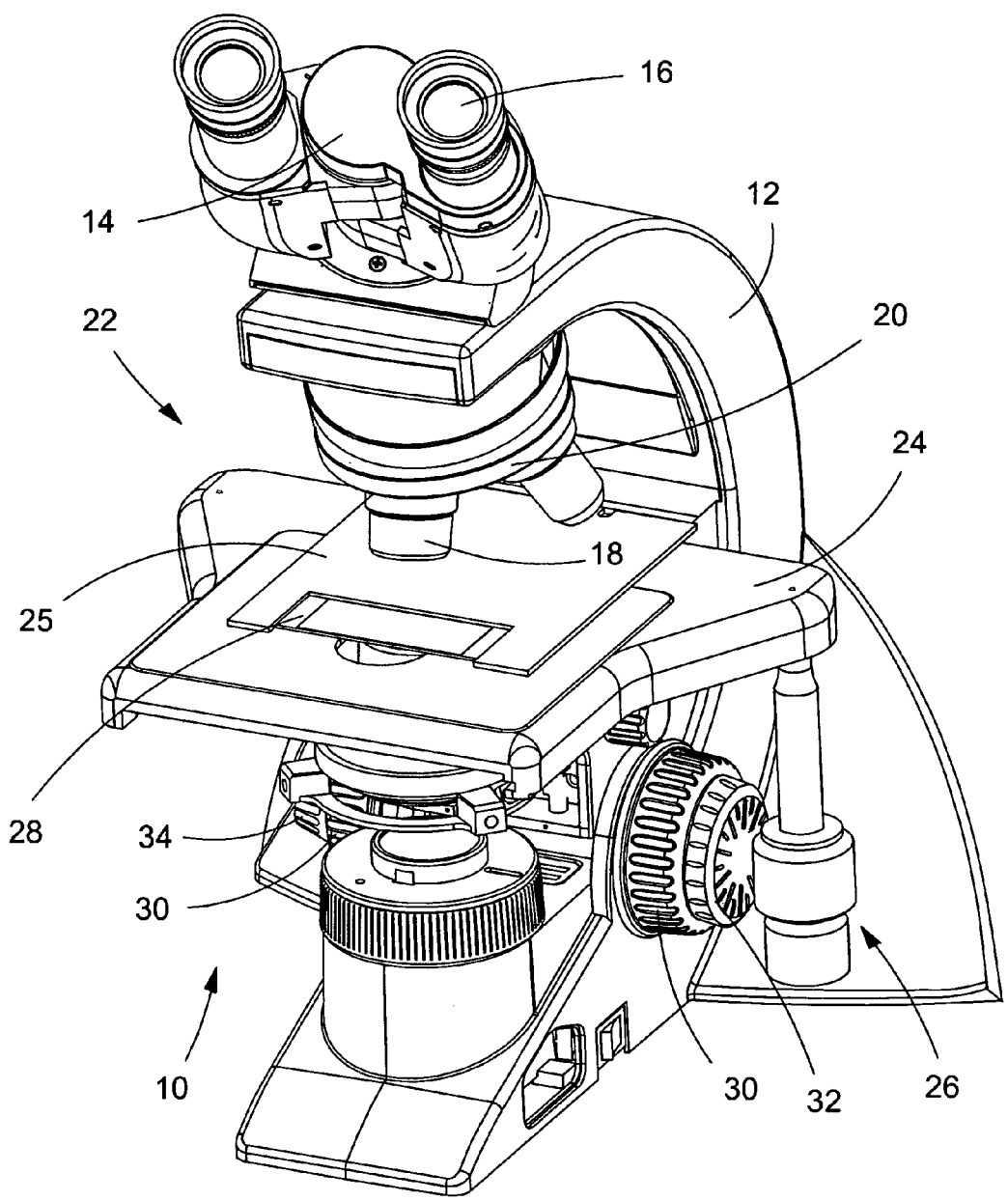
FIG. 1 is a front perspective view of a typical compound microscope configured for use with an interchangeable microscope stage drive assembly and interchangeable fine focus adjustment knobs according to the present invention.

Adverting now to the figures, FIG. 1 illustrates the general structures of microscope 10. In this figure it is seen that microscope 10 broadly comprises mounting stand 12 to which the various components of the microscope are mounted. In the embodiment shown, the viewing body 14 is binocular, comprising the body and two eyepieces 16. The viewing body is not particularly germane to the invention, which is suitable for use with a microscope configured with any type of viewing body (monocular, binocular, trinocular, video, etc.). Objective lenses 18 are mounted to rotatable turret 20. Microscope 10 further comprises interchangeable microscope stage system 22, which is mounted to stand 12. Interchangeable microscope stage system 22 comprises slide mount 25, stage 24, and drive mechanism 26. Slide mount 25 is incorporated into stage system 22 and enables movement of slide 28 holding the specimen to be viewed. Coarse focus knobs 30 and short and elongate fine focus knobs 32 and 34, respectively, are independently rotatable with respect to one another, that is, coarse focus knobs 30 may are independently rotatable with respect to the fine focus knobs 32 and 34. In one embodiment, coarse focus knobs 30 may be adapted for rotating coarse focus drive shaft 45 and fine focus knobs 32 and 34 may be adapted for rotating fine focus drive shaft 43, which fine focus drive shaft 43 is coaxial with coarse focus drive shaft 45 (see FIG. 13). In use, the rotation of coarse focus knobs 30 and short and elongate fine focus knobs 32 and/or 34 rotate one or more drive shafts 43 and 45 (see FIG. 13) to cause the upward and downward movement of stage 24. Vertical displacement of stage 12 causes slide 28 to be moved within the optical path of the microscope which focuses on the object plane. Coarse focus knobs 30 and short and elongate focus knobs 32 and 34 are shown as being mounted on the sides of stand 12.

Figure 2:
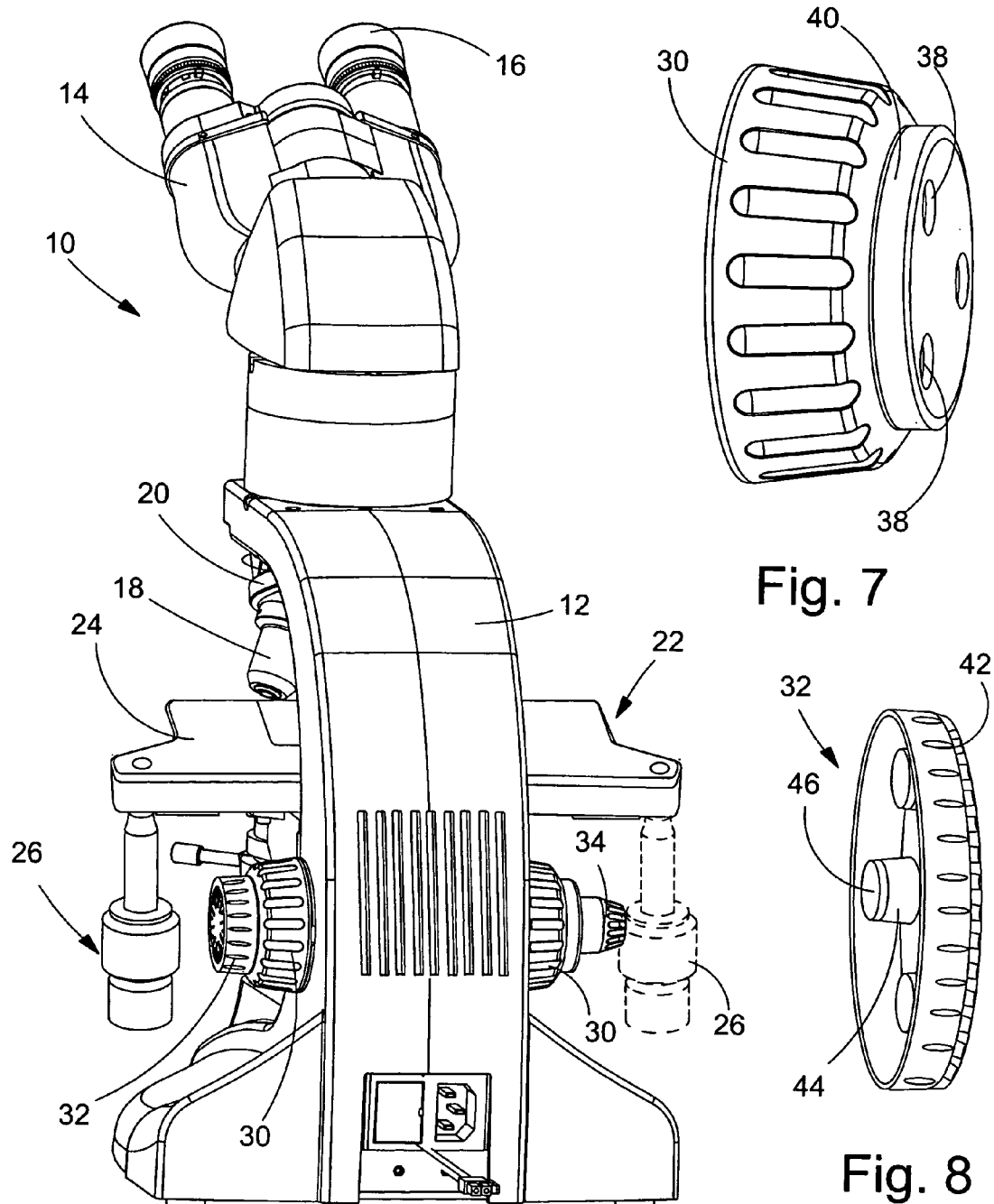
FIG. 2 is a rear perspective view of the microscope of FIG. 1, albeit further illustrating by way of "phantom" lines, interference between interchangeable microscope drive assembly and a fine focus adjustment knob.
Figure 3:
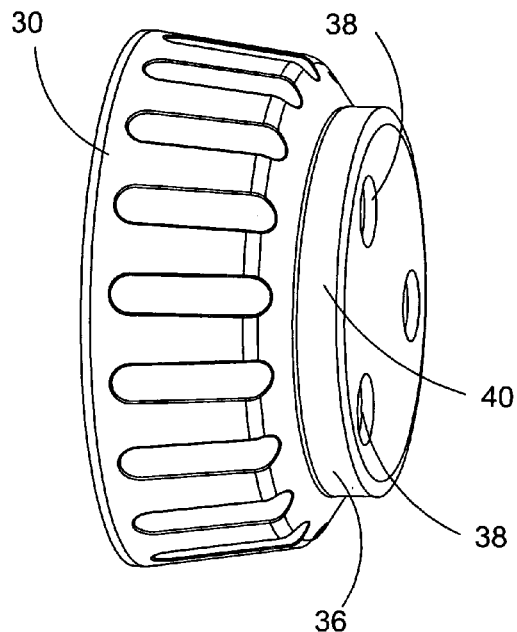
FIG. 3 is a perspective view of a coarse focus knob and rotatable focus drive means according to the present invention.

Referring now to FIG. 2, microscope 10 comprises interchangeable stage system 22 which is operatively arranged to allow the microscopist to selectively move stage drive mechanism 26 from one side of the microscope to the other depending on the user's handedness. Additionally, microscope 10 is also ergonomically designed to prevent and/or minimize the microscopist from leaning forward with one arm to adjust the x, y or z stage positions. As a result, in order to prevent such "leaning" by a user, the longitudinal axis of the stage drive mechanism 26 and the longitudinal axes of coarse and fine focus knobs 30, 32 and 34 intersect one another when the stage/specimen is placed in the "center" position and aligned with the optical beam path. Moreover, when stage drive mechanism 26 is configured in such manner, it does not travel outside the circumference of coarse focus knobs 30 when the stage is moved forward or rearward.

In a microscope having such configuration, where the microscopist locates the stage drive mechanism 26 on the same side of the microscope as the elongate fine focus knob 34, the two structures tend to interfere with one another as illustrated by the "phantom" illustration of stage drive mechanism 26 of FIG. 2. As a result, the microscopist must be capable of readily moving the fine focus knobs 32, 34 from one side of the microscope to the other to accommodate the newly located stage drive mechanism 26.

As illustrated in FIGS. 3-8, fine focus knobs 32 and 34 are adapted to be readily selectively released and fastened to right and left sides, i.e., opposite sides, of the microscope as may be desired. In a preferred embodiment, the fine focus knobs are releasably fastenable to rotatable focus drive means 36, which comprise hubs disposed on each side of the microscope stand. Rotatable focus drive means 36 rotate independently with respect to coarse focus adjustment knobs 30 and may communicate with fine focus drive shaft 43 (see FIG. 13) of the vertical stage drive mechanism (not shown) to cause vertical displacement of the microscope stage. Thus, rotatable focus drive means 36 are largely responsible for acutely focusing upon a specimen. In a preferred embodiment, rotatable focus drive means 36 comprise a magnetically attractive material, such as a ferromagnetic stainless steel, and have a circumference 40. Rotatable focus drive means 36 include one or more fastening means 38, which in this case comprise a plurality of pin receiving means, for aligning and releasably fastening the fine focus knobs 32 and 34 thereto.

Figure 4:
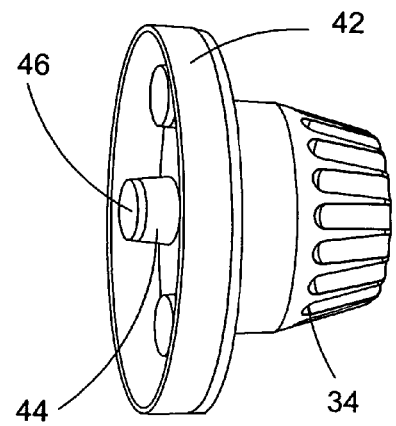
FIG. 4 is a perspective view an elongate fine focus knob according to the present invention.
Figure 5:
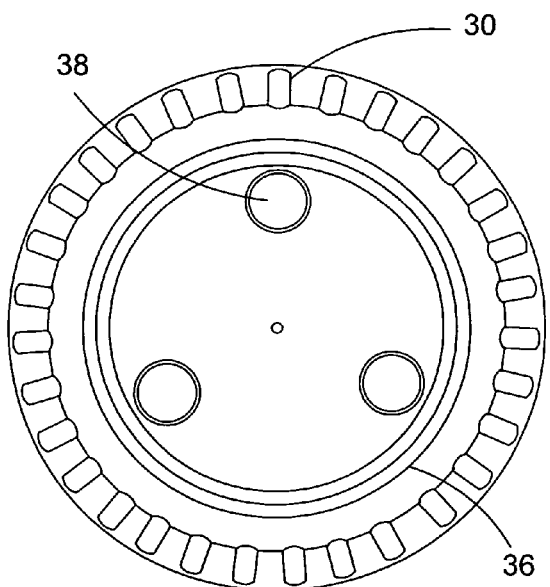
FIG. 5 is front view of the coarse focus adjustment knob and rotatable focus drive means of FIG. 3.
Figure 6:
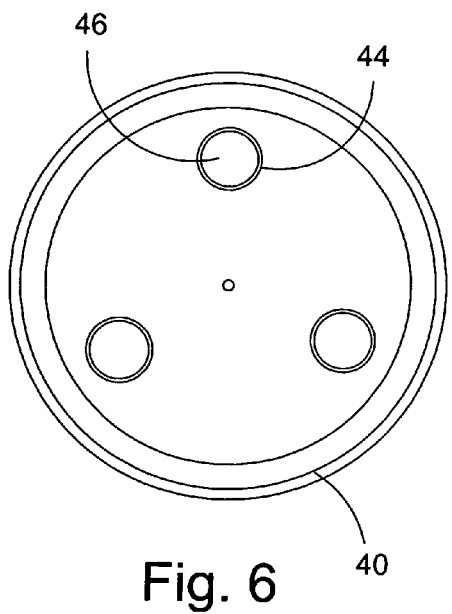
FIG. 6 is rear view of the elongate fine focus knob of FIG. 4.
Figure 9:
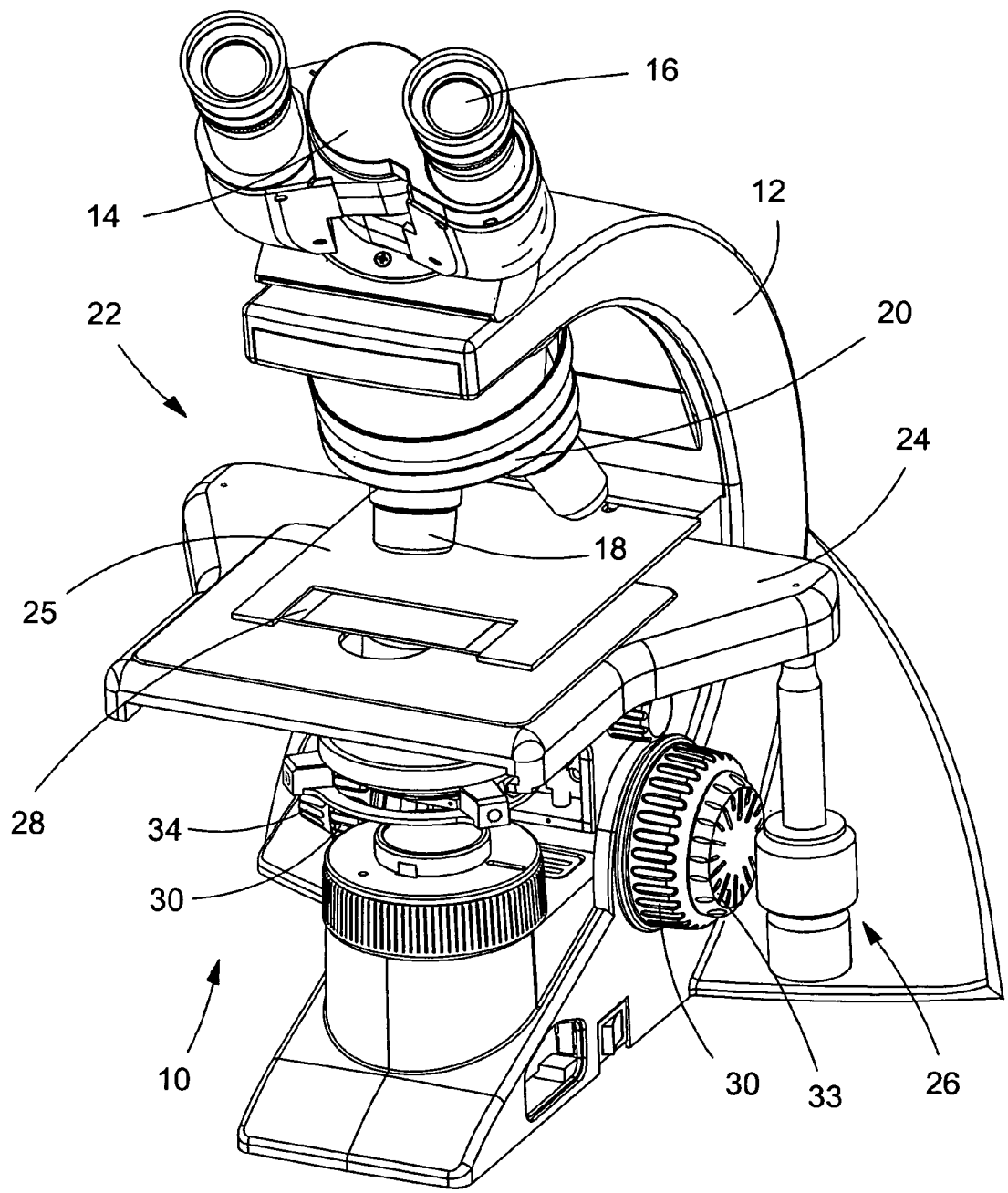
FIG. 9 is a front perspective view of an alternative embodiment of a microscope according to the present invention.

As illustrated in FIGS. 4, 6 and 8, in a preferred embodiment the fine focus knobs are adapted to be releasably fastenable to the rotatable focus drive means such that the stage height may be acutely adjusted. Preferably, fine focus knobs 32 and 34 are fabricated from a non-ferromagnetic material and comprise band portion 42. Band portion 42 is adapted for fit about circumference 40 of rotatable focus drive means 36. Fine focus knobs 32 and 34 further include one or more complementary fastening means 44, which in this case comprise a plurality of pin means that are positioned and shaped for complementary mate with fastening means 38. Fastened proximate the terminal ends of each complementary fastening means 44 are magnets 46. Magnets 46 provide an attractive force between the fine focus knobs and the rotatable focus drive means such that the fine focus knobs remain sufficiently fastened thereto and allow rotation of the rotatable focus drive means. Thus, it is seen that the fine focus knobs may be readily removed and re-fastened to a preferred side of the microscope depending upon a user's handedness.

Referring now to FIGS. 9-12, an alterative embodiment of the present invention may be configured to comprise fine focus knob 33 disposed on a same side of the microscope as stage drive mechanism 26 such that adjustment of the microscope stage in the x, y and z directions, and more particularly, fine focal adjustment, may be accomplished on the same side of the microscope. As shown more clearly in FIGS. 9, 10 and 12, fine focus knob 33 is illustrated as being disposed on a same side of the microscope as stage drive mechanism 26. Fine focus knob 33 is substantially similar to fine focus knobs 32 and 34, except the width of band portion 42 of fine focus knob 33 is less than that of fine focus knobs 32 and 34. This reduction in width of the band portion 42 of fine focus knob 33 allows the knob to more readily and ergonomically fit between the focus drive means 36 and stage drive mechanism 26. Thus x, y and z stage adjustment may be accomplished on a same side of the microscope using a single hand. It should be further appreciated that band portion 42 may be tapered such that fine focus knob 33 comprises a frustum. Additionally, it should be appreciated by those having ordinary skill in the art that while the FIG. 9-12 illustrate fine focus knob 33 as comprising a substantially knurled surface, the surface of fine focus knob 33 may comprise other means for increasing grip or comprise a smooth surface to differentiate such knob from the coarse focus knobs.

Figure 13:
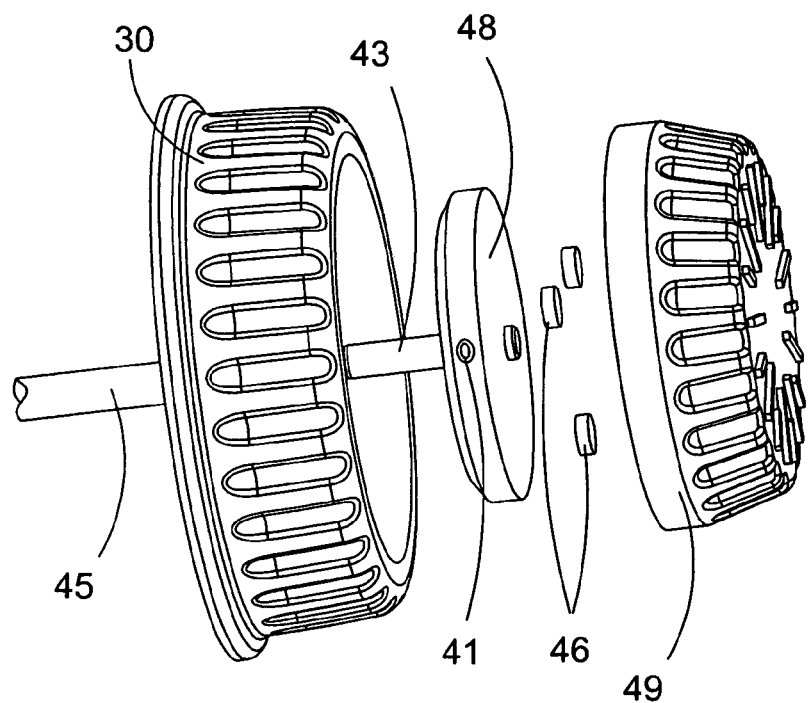
Figure 14:
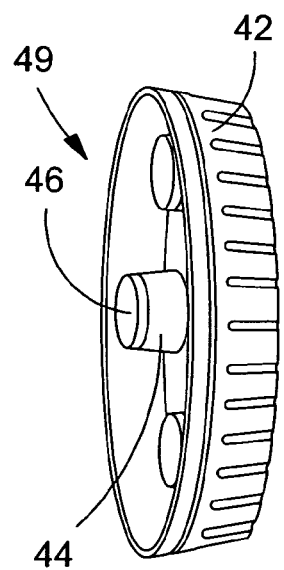

A further embodiment of the present invention may be configured to comprise a rotatable focus drive means that is recessed within coarse focus adjustment knob 30, independently rotatable therewith, and configured for preventing damage to sensitive internal microscope focusing drive/gearing mechanisms. Referring now to FIGS. 13 and 14, a microscope according to the present invention may be configured to comprise coarse adjustment knob 30, rotatable focus drive means 48, which is recessed within and independently rotatable with respect to coarse focus knob 30, and fine focus knob 49. In such embodiment, rotatable focus drive means 48 comprises a planar outer face which may be secured to fine focus drive shaft 43, which shaft is coaxial with coarse focus drive shaft 45. Rotatable focus drive means 48 may be secured to fine focus drive shaft 43 by fastening screw 41. It should be appreciated that the outer surface, or face, of rotatable focus drive means 48 is configured such that it does not comprise pin receiving means and is, preferably, formed from a magnetically attractive material such that magnets 46 fastened to pins 44 of fine focus knob 49 may be attractively secured thereto. The magnetic attraction between magnets 46 of fine focus knob 49 and the magnetically attractive surface of rotatable focus drive means 48 is of such force that a microscope operator may finely adjust the object plane of the microscope by rotating knob 49. However, the magnetic force between magnets 46 and rotatable focus drive means 48 is also of such force to allow fine focus knob 49 to slidably rotate thereon when the upper and lower focusing limits of focus are reached. Thus, because the fine focus knobs are adapted to rotate upon the fine focus drive means when the upper and lower limits of focus are reached, damage to sensitive internal microscope focusing drive/gearing mechanisms may prevented, as may occur for example when a microscope objective bottoms out on a slide.

Finally, it should be appreciated by those having ordinary skill in the art that while a preferred embodiment of the present invention comprises magnetically attractive materials for providing the ready movement of the fine focus knobs from one side of the microscope to the other, other appropriate materials and structures may be substituted for achieving like results. For example, the fine focus knobs and/or the rotatable focus drive means may comprise hook and loop type fasteners, springed ball/detent assemblies, clutch assemblies, press fits, etc. for releasably fastening the fine focus knobs to the rotatable focus drive means. Other means may also be provided for allowing the focusing knobs to rotate upon their drive means when the upper and lower microscope focusing limits have been reached. Additionally, it should be appreciated by those having ordinary skill in the art that while the present specification has primarily illustrated an elongate fine focus knob associated with a fine focus knobs having a smaller widths, the various fine focus knobs of the present invention may be interchanged with one another as a user may desire.

Thus, it is seen that the objects of the present invention are efficiently obtained, although modifications and changes to the invention should be readily apparent to those having ordinary skill in the art, which modifications are intended to be within the spirit and scope of the invention as claimed.

What is claimed is:

1. A removable interchangeable focus adjustment knob, said removable focus adjustment knob is magnetically fastenable to a planar outer surface of a focus adjustment means in a manner that prevents separation of said removable focus adjustment knob from said focus adjustment means in an axial direction during rotational movement of said knob, and enables rotational slippage between said removable focus adjustment knob and said focus adjustment means when upper and lower limits of focusing are reached.

2. The adjustment knob of claim 1 wherein said focus adjustment means comprises a rotatable shaft.

3. The adjustment knob of claim 1 adapted for complementary magnetically attractive engagement with said focus adjustment means.

4. A microscope comprising:
a focus adjustment means and a removable interchangeable focus adjustment knob, said removable focus adjustment knob is magnetically and removably fastenable to a planar outer surface of said focus adjustment means in a manner that prevents axial separation of said removable focus adjustment knob from said focus adjustment means during rotational movement of said knob, and enables rotational slippage between said removable focus adjustment knob and said focus adjustment means when upper and lower limits of focusing are reached.

5. The microscope of claim 4 wherein said focus adjustment means comprises a rotatable shaft attached opposite the attachment of said removable focus adjustment knob to said planar outer surface.

6. The microscope of claim 4 wherein said focus adjustment knob is adapted for complementary magnetically attractive engagement with said focus adjustment means.

7. The microscope of claim 4 comprising a second focus adjustment means.

8. The microscope of claim 7 wherein said second focus adjustment means comprises a second focusing means.

9. The microscope of claim 7 wherein said removable interchangeable focus adjustment knob is magnetically fastenable to a planar outer surface of said second focus adjustment means.

10. A microscope comprising:
a focus adjustment means comprising a first focus adjustment knob and a removable focus adjustment knob;
a focus drive means having a planar outer surface, wherein said removable focus adjustment knob is removably attachable to said planar outer surface, said first focus adjustment knob and said removable focus adjustment knob are coaxial and independently rotatable with respect to one another at the same time, and said removable focus adjustment knob is removably attachable to the left or the right side of said microscope.

11. The microscope of claim 10 wherein said focus drive means includes a rotatable shaft.

12. The microscope of claim 11 wherein said removable focus adjustment knob is removably attachable to said focus drive means by a complementary fastening means that prevents separation of said removable focus adjustment knob in an axial direction from said focus drive means, and enables rotational slippage between said removable focus adjustment knob and said focus drive means when upper and lower focusing limits are reached.

13. The microscope of claim 12 wherein said complementary fastening means is magnetic.

14. The microscope of claim 12 wherein said complementary fastening means comprises pin means extending axially of said removable focus adjustment knob and pin receiving means complementarily extending axially of said focus drive means.

15. The microscope of claim 14 wherein one of said pin means and said pin receiving means is formed of magnetic material and the other of said pin means and said pin receiving means is formed of magnetically attractable material.

16. The microscope of claim 10 wherein said focus drive means is operatively arranged for causing vertical displacement of a microscope stage.

17. The microscope of claim 16 comprising at least two focus adjustment means, each having a removable focus adjustment knob, disposed on opposite sides of said microscope.

18. The microscope of claim 17 wherein one of said removable focus adjustment knobs has an axial length greater than another.

* * * * *